(12) United States Patent  
Kramer

(10) Patent No.: US 7,481,301 B2
(45) Date of Patent: Jan. 27, 2009

(54) FORCE SENSOR FOR VEHICLE BRAKE APPLICATION

(75) Inventor: Dennis A. Kramer, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 663 days.

(21) Appl. No.: 10/715,051

(22) Filed: Nov. 17, 2003

(65) Prior Publication Data

US 2005/0103580 A1 May 19, 2005

(51) Int. Cl.
*F16D 66/02* (2006.01)
*F16D 65/36* (2006.01)

(52) U.S. Cl. .......................... 188/1.11 W; 188/1.11 E; 188/71.7

(58) Field of Classification Search ........... 188/1.11 W, 188/1.11 L, 1.11 E, 71.7, 73.1, 79.51, 79.56, 188/156–158, 195
See application file for complete search history.

(56) References Cited

U.S. PATENT DOCUMENTS

| | | | | |
|---|---|---|---|---|
| 4,520,661 A | * | 6/1985 | Tamai et al. ................... 73/129 |
| 4,606,435 A | * | 8/1986 | Johnson .................... 188/1.11 L |
| 4,784,244 A | * | 11/1988 | Carre et al. .................. 188/156 |
| 5,848,672 A | * | 12/1998 | Brearley et al. ......... 188/1.11 L |
| 6,129,183 A | * | 10/2000 | Ward ....................... 188/1.11 L |
| 6,272,936 B1 | * | 8/2001 | Oreper et al. ........... 73/862.621 |
| 6,276,494 B1 | * | 8/2001 | Ward et al. ............. 188/1.11 W |
| 6,293,370 B1 | | 9/2001 | McCann |
| 6,397,977 B1 | * | 6/2002 | Ward ....................... 188/1.11 L |
| 6,817,452 B2 | * | 11/2004 | Heinlein .................... 188/72.9 |
| 6,820,730 B2 | * | 11/2004 | Angerfors .................. 188/71.9 |

* cited by examiner

Primary Examiner—Melody M Burch

(57) ABSTRACT

A force sensor is incorporated into a disc brake, and is operable to sense the point of force application increase during application of the disc brake. The force will increase sharply once the brake pad initially contacts the rotor. The sensor is able to determine the point of this force increase, and provide this information to a control. The control powers an electric motor for providing electric motor adjustment of the position of the piston which drives the brake pad, to compensate for wear. In a preferred embodiment, the sensor includes a protective cover with a thin anvil between the cover and the sensor. The anvil is operable to transmit the force, and limit the force applied, to protect the sensor.

21 Claims, 4 Drawing Sheets

FORCE SENSOR FOR VEHICLE BRAKE APPLICATION

BACKGROUND OF THE INVENTION

This application relates to a force sensor utilized in combination with an adjustment mechanism for a disc brake, wherein the force sensor provides an accurate indication of the point of brake application to a control associated with the adjustment mechanism.

Disc brakes have historically included a mechanical adjustment mechanism to adjust for wear. As known, in a disc brake, a brake actuator drives a pair of pistons, and the pistons force a brake pad against a rotor, slowing rotation of the rotor. There is normal wear on the brake pad, and typically the pistons are provided with the mechanical adjustment mechanism. The mechanical adjustment mechanism includes a mechanical linkage that senses the total movement, and adjusts the pistons relative to tappet gears to take up clearance. Typically, there is a desired amount of piston movement, and with wear on the brake pad, the pistons need to move an amount beyond this desired amount. Thus, the mechanical adjustment mechanism changes a rest, or starting position of the pistons such that they only need to move the desired amount, even with wear on the brake pad.

More recently, electric motors have been developed for replacing the mechanical linkage in the adjustment mechanism. An electric motor typically drives a gear, that in turn will drive the tappet gears to adjust the pistons.

Such electric motor adjustment mechanisms would desirably have an indication of when the brake first came into contact with the rotor, as this is an important measurement for determining an accurate amount of adjustment. However, to date, no practical application or location for placement of a force sensor has been identified in the disc brake environment. Strain gauges, etc. have been placed along the force transmission path, however, these are not practical in the environment of the disc brake actuation assembly. Typically, there is little available space along the transmission path.

Force sensors have also been proposed incorporated into the actuator. However, this location is somewhat remote and may not provide feedback as accurately as desired.

SUMMARY OF THE INVENTION

In the disclosed embodiment of this invention, a force sensor is placed at a location such that it can sense the increase in force when the brake pads initially contact the rotor. This force provides an indication to a control for an electric adjustment motor of the amount of clearance in the disc brake. The control can then utilize this measurement to determine the amount of adjustment that would be desirable.

The force sensor is preferably at a location where it is in line of a reaction force between an actuator and the brake pad. More preferably, a bearing cup that supports an eccentric pivoting shaft receives the sensor on a face opposed to a location of the bearings supported by the bearing cup. The eccentric shaft is driven by the actuator and pivots to move the bearings, to in turn actuate the disc brake. The bearing cup receives a reaction force from this force application. The reaction force is transferred to the sensor. In this manner, the sensor is able to provide a very good indication of the initiation of the force increase, which is the time when all clearance has been taken up. A second sensor may monitor movement, such as eccentric shaft rotation, to associate the point of force increase to an amount of movement.

In a most preferred embodiment, the sensor includes a force sensor of the type that receives a small electric current. An example would be a sensor from Tekscan branded as "FlexiForce" as described in U.S. Pat. No. 6,272,936. Electric resistance to the current flow decreases as the force on the sensor increases. In the most preferred embodiment, a protective cover is placed over the sensor, and a very thin "anvil" is placed between the cover and the sensor. The anvil provides the force transmission point between the cover and the sensor. The anvil limits the amount of force that can be transferred from the cover to the sensor, thus protecting the sensor.

When the brake is applied, the resistance should be relatively constant as the clearance is taken up. Once all clearance has been taken up, the brake pad begins to contact the rotor. At that point, a sharp increase in the force being applied will be sensed as a reaction force at the sensor. At this time, the resistance at the sensor will drop off sharply. The sensor sends a signal to a control for an adjustment motor. This drop off in resistance can be identified by the control as the point at which all clearance has been taken. This position, combined with other sensor information indicative of the amount of total movement of the brake will allow the control to determine an appropriate amount of adjustment.

These and other features of the present invention can be best understood from the following specification and drawings, the following of which is a brief description.

DETAILED DESCRIPTION OF THE PREFERRED EMBODIMENT

Figure 1:
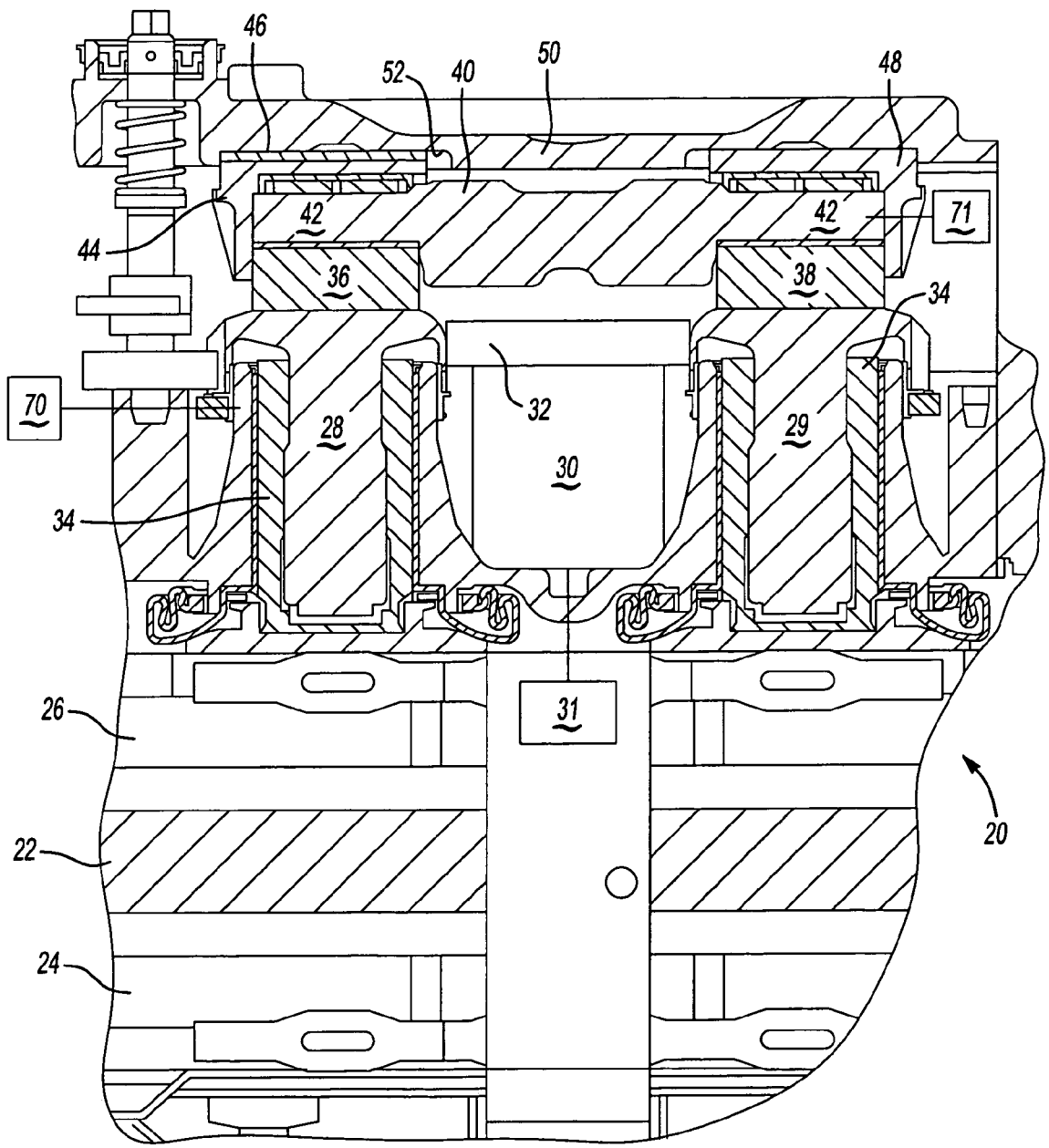
FIG. 1 is a cross-sectional view through a disc brake incorporating the present invention.

Disc brake 20 is illustrated in FIG. 1 having an actuator shaft 40, as known. A brake pad 26 is driven toward a rotor 22 that is to be braked by the disc brake 20. A pair of actuator pistons 34 drive the brake pad 26 toward rotor 22 upon control of the actuator shaft 40 as explained below. As known, an opposed brake pad 24 is also brought into contact with rotor 22.

As known, the position of the pistons 34 should be adjusted toward the item to be braked, or downwardly as shown in FIG. 1, with wear on the brake pads 24 and 26. Thus, it is known to have tappet gears 28 and 29 for providing adjustment. Historically, this adjustment has been mechanical. However, more recently, this adjustment has been provided by utilizing an electric motor. Elector motor 30 is illustrated schematically in FIG. 1 driving a gear 32 to drive tappet gears 28 and 29. Such an arrangement is shown, for example in U.S. Pat. No. 6,293,370.

As can be appreciated, pistons 34 have internally threaded inner peripheries which are driven when the tappet gears 28 and 29 are rotated by the gear 32. In this manner, the pistons 34 can be advanced toward the brake pad 24 to accommodate wear. The pistons 34 are constrained against rotation, such that when the tappet gears 28 and 29 are driven to turn, the threads advance the pistons 34 forwardly.

When shaft 40 is turned to rotate by an actuator (not shown), eccentric ends 42 drive bearings 36 and 38, each having an eccentric bore. As the bearings turn with the shaft 40, they move to force the tapper gears 28, 29 and pistons 34 downwardly as shown in FIG. 1, bringing brake pads 26 and 24 into contact with the rotor 22.

Bearing cups 44 and 48 provide a mounting surface for the bearings 36 and 38, respectively. The bearing cups 44 and 48 are mounted within cavities 52 in a housing 50.

A thin force sensor 46 is mounted between the bearing cup 44 and the cavity 52 in housing 50. This thin sensor is mounted in a location that is not along a line of force transmission between the shaft 40 and tappet gears 28 or 29. Rather, a reaction force would be transmitted from the bearing 36 to the bearing cup 44, and then to the sensor 46. This location for the sensor 46 allows for minimal necessary change in the overall disc brake 20. Simply, the cavity 52 or the bearing cup 44 may be sized to accommodate the sensor 46.

Also as shown in this figure, a separate sensor 70 such as disclosed in the above-referenced U.S. patent application may monitor total movement of the pistons 34 during braking application. Also, another sensor 71 may monitor the amount of rotation of the shaft 40. The amount of rotation of the shaft 40 may be sent to the control 31 along with the point of force application sensed by the sensor 46, such that the point of force application can be associated with a particular point in the stroke of the actuator shaft 40. Further, the control 31 will receive information about total distance movement from the sensor 70. Again, the control 31 may utilize any one of the number of criteria to determine the amount of adjustment by the motor 30 for the position of the pistons 34 based upon the information from the sensor 46 and the sensor 70.

Figure 2:
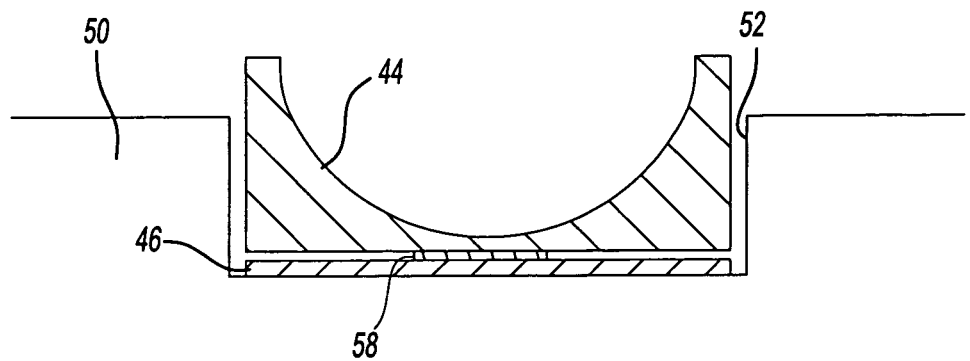
FIG. 2 shows one portion of the present invention.

FIG. 2 is a view showing the housing 50, the cavity 52, the bearing cup 44 (90° to the FIG. 1), and the sensor 46. As shown, the sensor 46 is sandwiched between the bearing cup 44 and the bottom wall of the cavity 52. The sensor may be placed in a recess created between bearing cup and cavity 52. As explained below, when the compressive anvil 58 is fully compressed to the depth of the cavity, no further change in resistance is produced by the sensor.

Figure 3:
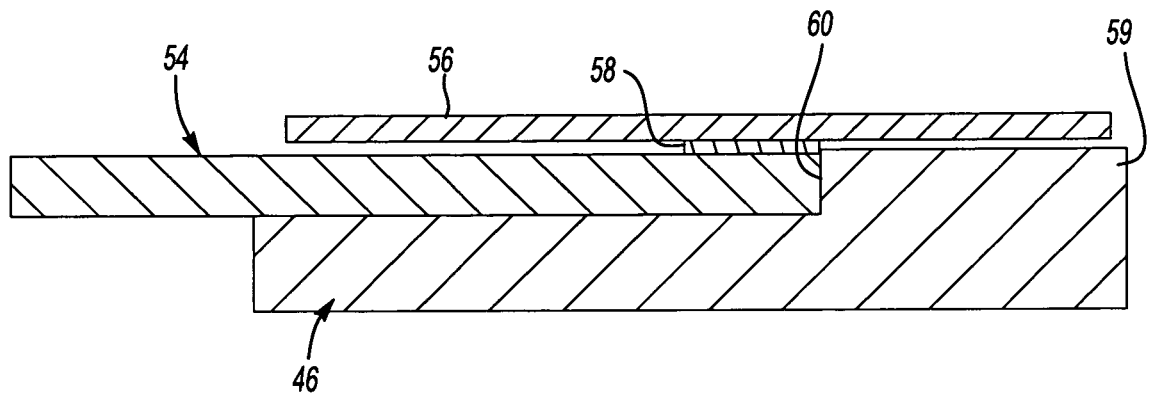
FIG. 3 is a cross-sectional view through the inventive sensor.
Figure 4:
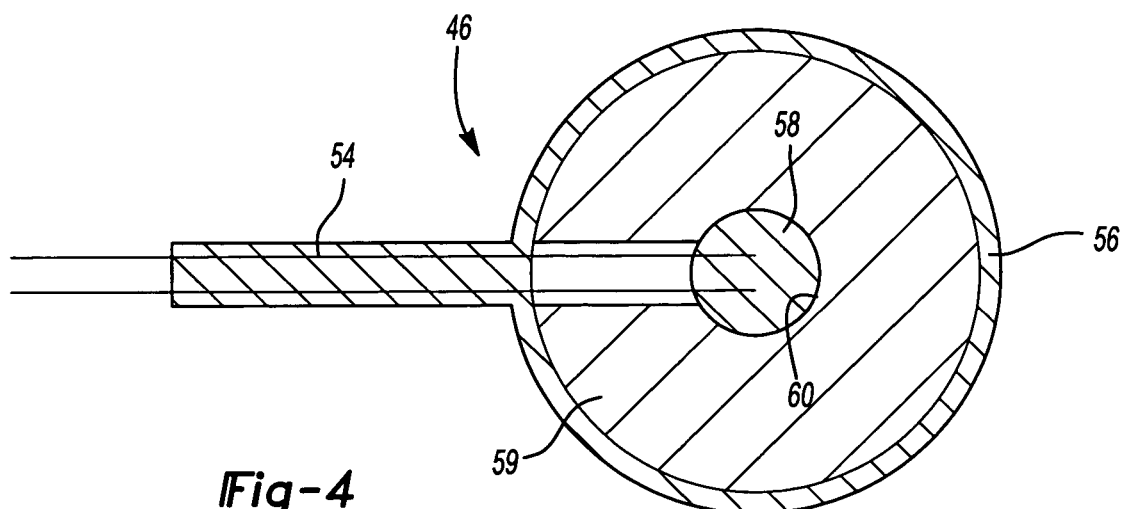
FIG. 4 is a plan view of the inventive sensor.

FIG. 3 shows the sensor 46 having an electric portion 54 receiving a small current, protective upper cover 56, an anvil 58 between electric portion 54 and the protective upper cover 56, and a cavity 60 within a housing 59 for the electric portion 54. As can be appreciated from this figure, when a force is applied from the bearing cup 44 to the protective upper cover 56, that force will be transmitted through the anvil 58 to the electric portion 54. The electric portion 54, as can be best seen in FIG. 4, includes a pair of electric wires providing a small current to a central portion aligned with the anvil 58. As the anvil 58 applies an increasing force to the wires in the vicinity of the anvil 58, the resistance to electric current flow decreases.

At some point, and as can be appreciated from FIG. 3, the anvil and the electric portion 54 will be fully compressed such that no further increase in force will be transmitted from the anvil 58 to the electric portion 54 of the sensor 46. At that point, the resistance will become static.

Figure 5:
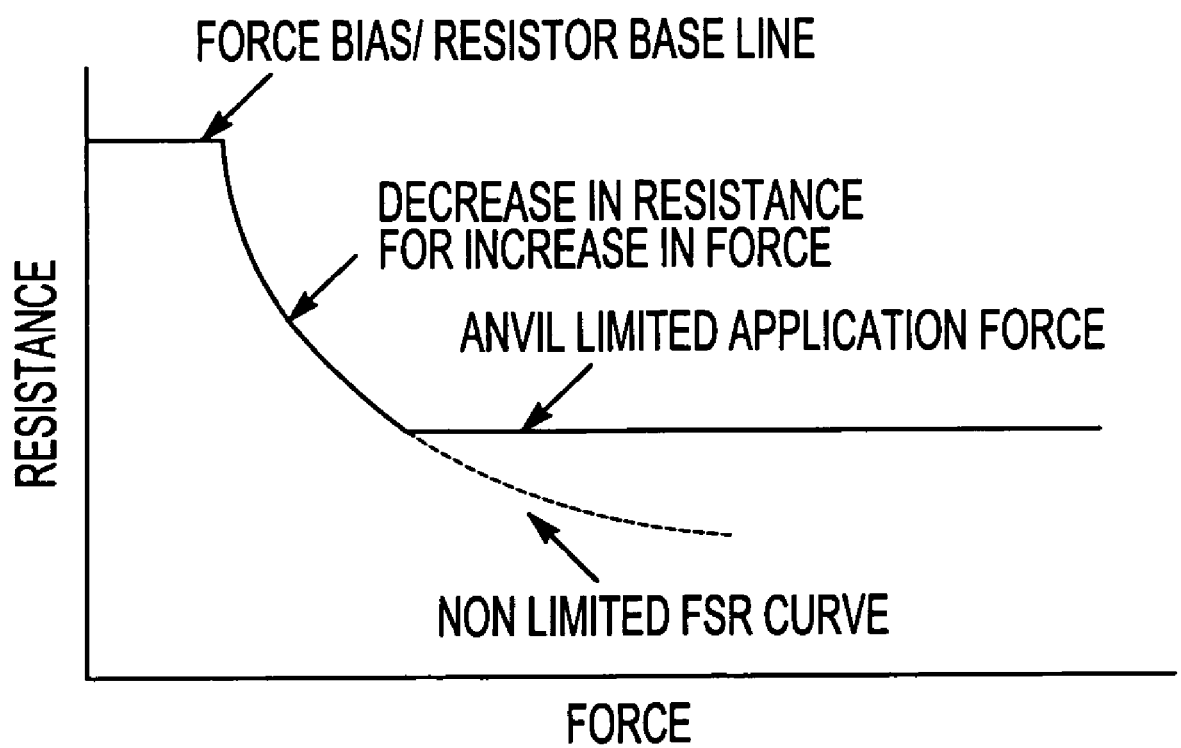
FIG. 5 is a graph showing the signal output of the inventive force sensor.

FIG. 5 shows the resistance by the electric portion 54 as a function of the force applied. An initial constant force will occur once all clearance is taken up and when the brake actuation begins. A sharp downward slope will then begin once brake pads 24 and 26 begin to contact the rotor 22. It is this sharp decrease that will be reported by the sensor 46 to the control 31. The sensor may, as an example, pick a central point along this curve to identify as the point of force application.

As further shown, at some point, the anvil is compressed and no further increase in force will be transmitted. At that point, the resistance again becomes constant.

Figure 6:
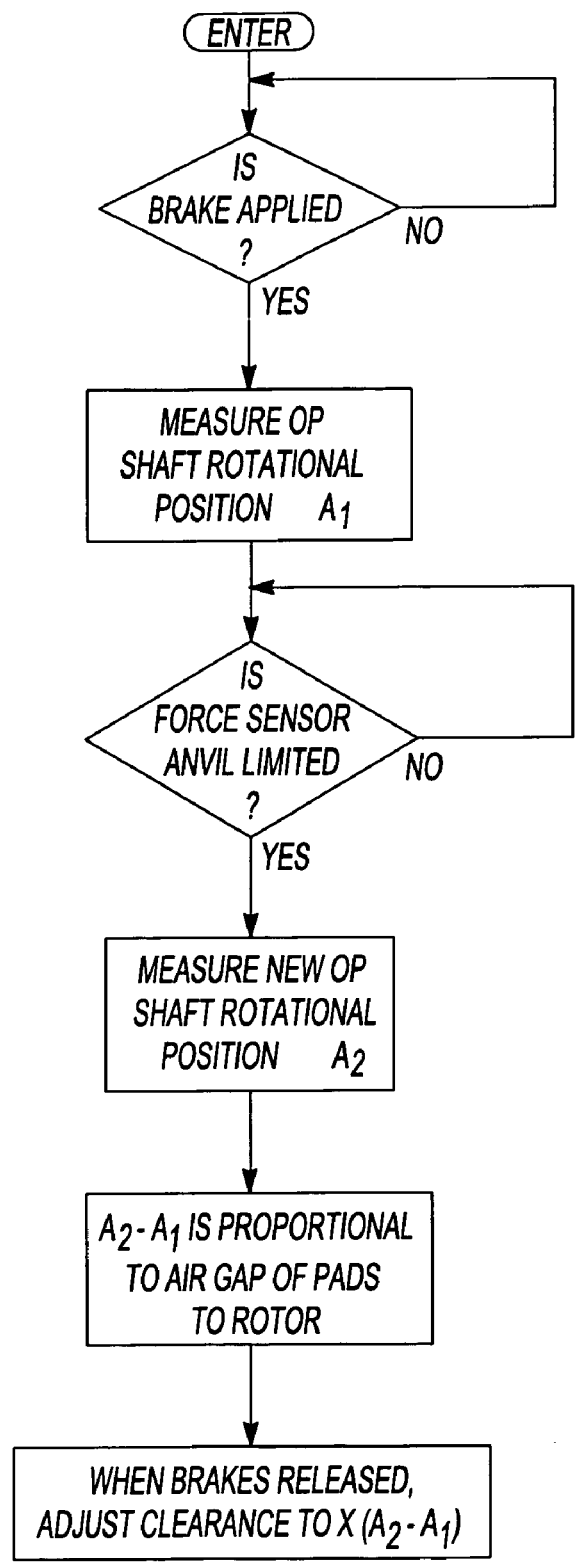
FIG. 6 is a flowchart showing how the inventive sensor is utilized.

As shown in the FIG. 6 flowchart, a control utilizes information from the sensor 46 by measuring shaft rotation position ($A_1$) (sensor 71) and then asking whether the force from the sensor 46 has reached the limit point shown in FIG. 5. If not, the control continues to monitor when the application of force reaches the limit. Once the force reaches the limit, a second measurement of shaft rotation position is taken ($A_2$). The difference between the two shaft rotational positions ($A_2-A_1$) is related to the air gap of the pads relative to the rotor. Then, when the brake is released, clearance can be adjusted based upon this difference (X). As shown, the entire difference will not typically be adjusted, but rather some portion of the difference. As an example, 0.5 of the distance is often utilized.

The present invention thus describes a sensor that can be easily retrofit into existing disc brake designs without requiring major re-engineering. Moreover, placing the sensor in line of a reaction force is an improvement over the prior art that placed a sensor either remote from any direct feedback from the actual application and movement, that is outside of the housing, or alternatively along the path of force transmission, but in a location that has limited space.

The present inventive sensor and location thus provide valuable benefits over the prior art.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A disc brake comprising:
an actuation mechanism being movable to apply a braking force;
a pair of pistons movable upon receipt of said braking force to force a brake pad into contact with an item to be braked;
an adjustment mechanism for adjusting a location of said pair of pistons to take up clearance with wear in said brake pad; and
a force sensor for sensing a reaction force to said braking force, and identifying a point of force application increase indicative of initial contact of said brake pad with the item to be braked, said force sensor sending a signal to an electric control for said adjustment mechanism.

2. The disc brake as set forth in claim 1, wherein said actuation mechanism includes an eccentric shaft, said eccentric shaft driving at least one bearing to in turn force said pair of pistons and said brake pad toward the item to be braked.

3. The disc brake as set forth in claim 2, wherein said force sensor is located to receive said reaction force from said eccentric shaft and said eccentric shaft applies said reaction force to said at least one bearing.

4. The disc brake as set forth in claim 3, wherein a bearing cup supports said at least one bearing and said eccentric shaft, said force sensor being placed on an opposed side of said bearing cup from a surface that supports said at least one bearing and said eccentric shaft.

5. The disc brake as set forth in claim 4, wherein said force sensor and said bearing cup are received in a cavity in a housing for said disc brake.

6. The disc brake as set forth in claim 4, wherein said force sensor has an outer cover, and a thin anvil member placed between said outer cover and said force sensor, said thin anvil member transmitting said reaction force from said outer cover to said force sensor, and said thin anvil member being operable to limit a total force applied to said force sensor.

7. The disc brake as set forth in claim 1, wherein said force sensor is an electric sensor receiving a current and having a resistance that varies with said reaction force applied to said force sensor.

8. The disc brake as set forth in claim 7, wherein said force sensor includes a protective cover between a member which applies said reaction force and an electric portion of said force sensor which receives said current.

9. The disc brake as set forth in claim 8, wherein a thin anvil member is placed between said protective cover and said electric portion, said thin anvil member transmitting force from said protective cover to said electric portion, and said thin anvil member limiting an amount of total force applied to said electric portion.

10. A disc brake comprising:
an actuation mechanism being movable to apply a braking force;
a pair of pistons movable upon receipt of said braking force to force a brake pad into contact with an item to be braked;
an adjustment mechanism for adjusting a location of said pair of pistons to take up clearance with wear in said brake pad; and
a force sensor for sensing a point of force application increase indicative of initial contact of said brake pad with the item to be braked, said force sensor sending a signal to an electric control for said adjustment mechanism, said force sensor being an electric sensor receiving a current and having a resistance that varies with a reaction force applied to said force sensor.

11. The disc brake as set forth in claim 10, wherein said force sensor includes a protective cover between a member which applies said reaction force to said force sensor and an electric portion of said force sensor which receives said current.

12. The disc brake as set forth in claim 11, wherein a thin anvil member is placed between said protective cover and said electric portion, said thin anvil member transmitting force from said protective cover to said electric portion, and said thin anvil member limiting an amount of total force applied to said electric portion.

13. The disc brake as set forth in claim 12, wherein said actuation mechanism includes an eccentric shaft, said eccentric shaft driving at least one bearing to in turn force said pair of pistons and said brake pad toward the item to be braked.

14. The disc brake as set forth in claim 13, wherein said force sensor is located to receive said reaction force from said eccentric shaft and said eccentric shaft applies said reaction force to said at least one bearing.

15. The disc brake as set forth in claim 14, wherein a bearing cup supports said at least one bearing and said eccentric shaft, said force sensor being placed on an opposed side of said bearing cup from a surface that supports said at least one bearing and said eccentric shaft.

16. The disc brake as set forth in claim 15, wherein said force sensor and said bearing cup are received in a cavity in a housing for said disc brake.

17. The disc brake as set forth in claim 16 wherein said thin anvil member is a compliant member whose deformation is limited by the cavity.

18. A disc brake comprising:
an actuation mechanism being movable to apply a braking force;
a pair of pistons movable upon receipt of said braking force to force a brake pad into contact with an item to be braked, said actuation mechanism including an eccentric shaft, said eccentric shaft driving at least one bearing to in turn force said pair of pistons and said brake pad toward the item to be braked, a bearing cup supporting said at least one bearing and said eccentric shaft, said bearing cup received in a cavity in a housing for said disc brake;
an adjustment mechanism for adjusting a location of said pair of pistons to take up clearance with wear in said brake pad; and
a force sensor for sensing a point of force application increase indicative of initial contact of said brake pad with the item to be braked, said force sensor sending a signal to an electric control for said adjustment mechanism, said force sensor being positioned between said bearing cup and said cavity, said force sensor being an electric sensor receiving a current and having a resistance that varies with a reaction force applied to said force sensor.

19. The disc brake as set forth in claim 18, wherein said force sensor includes a protective cover between said bearing cup and an electric portion of said electric sensor which receives said current.

20. The disc brake as set forth in claim 19, wherein a thin anvil member is placed between said protective cover and said electric portion, said thin anvil member transmitting force from said protective cover to said electric portion, and said thin anvil member limiting an amount of total force applied to said electric portion.

21. The disc brake as set forth in claim 1, wherein said signal is utilized to identify the point of force application, and the point of force application is associated with a rotational position of a portion of the actuation mechanism, the rotational position being utilized after application of a braking force to identify a gap between components of the disc brake, to in turn identify a clearance that is adjusted by said adjustment mechanism after the application of the braking force.

* * * * *